United States Patent
Klarqvist (10) Patent No.: US 10,600,435 B2
(45) Date of Patent: Mar. 24, 2020

(54) RECORDING HEAD GIMBAL ASSEMBLY PROGRAMMING BY SELECTIVE APPLICATION OF INTERCONNECTS

(71) Applicant: Seagate Technology LLC, Cupertino, CA (US)

(72) Inventor: Jon Karsten Klarqvist, Roseville, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 15/813,391

(22) Filed: Nov. 15, 2017

(65) Prior Publication Data

US 2019/0147908 A1    May 16, 2019

(51) Int. Cl.
| | | |
|---|---|---|
| *G11B 5/48* | (2006.01) | |
| *G11B 5/60* | (2006.01) | |
| *G11B 19/02* | (2006.01) | |

(52) U.S. Cl.
CPC ............ *G11B 5/4853* (2013.01); *G11B 5/486* (2013.01); *G11B 5/6005* (2013.01); *G11B 19/02* (2013.01)

(58) Field of Classification Search
None
See application file for complete search history.

(56) References Cited

U.S. PATENT DOCUMENTS

| | | |
|---|---|---|
| 4,504,880 A | 3/1985 | Church et al. |
| 4,636,902 A | 1/1987 | Dalziel et al. |
| 5,285,341 A | 2/1994 | Suzuki et al. |
| 6,104,562 A | 8/2000 | Ottesen et al. |
| 6,249,890 B1 | 6/2001 | Ukani et al. |
| 6,320,714 B1 | 11/2001 | Moon et al. |
| 6,351,353 B1 | 2/2002 | Sluzewski et al. |
| 6,373,649 B1 | 4/2002 | Walker et al. |
| 6,424,475 B1 | 7/2002 | Bhandari et al. |
| 6,459,260 B1 | 10/2002 | Bonin et al. |
| 6,829,818 B2 | 12/2004 | Kamigama et al. |
| 7,102,842 B1 | 9/2006 | Howard et al. |
| 7,508,619 B2 | 3/2009 | Okamoto et al. |
| 7,532,437 B2 | 5/2009 | Liu et al. |
| 7,984,545 B2 | 7/2011 | Matsumoto et al. |
| 8,289,644 B2 | 10/2012 | Holmberg |
| 8,289,662 B2 | 10/2012 | Iben |
| 8,310,782 B2 | 11/2012 | Song et al. |
| 8,693,126 B2 | 4/2014 | Buckholdt et al. |
| 8,810,965 B2 | 8/2014 | Peng et al. |

(Continued)

FOREIGN PATENT DOCUMENTS

JP    S63103408 A    5/1988

*Primary Examiner* — Craig A. Renner
(74) *Attorney, Agent, or Firm* — Westman, Champlin & Koehler, P.A.

(57) ABSTRACT

A method for programming a head gimbal assembly. The method includes building a plurality of transducers into a slider, and testing the plurality of transducers to select one of the plurality of transducers for field operation. The method also includes providing an interconnect assembly having a plurality of traces with at least one of the plurality of traces having a plurality of electrically coupled bond pads. One of the plurality of bond pads is bonded electrically to the selected transducer out of the plurality of transducers, and the other bond pads of the plurality of bond pads are not electrically coupled to any of the plurality of transducers.

19 Claims, 11 Drawing Sheets

(56) References Cited

U.S. PATENT DOCUMENTS

| | | |
|---|---|---|
| 9,099,103 B1 | 8/2015 | Krichevsky |
| 9,099,125 B1 | 8/2015 | Hattori et al. |
| 9,142,246 B1 | 9/2015 | Trantham et al. |
| 9,251,844 B1 | 2/2016 | Wheelock et al. |
| 9,251,856 B1 | 2/2016 | Wheelock et al. |
| 9,286,926 B1 | 3/2016 | Dhanda et al. |
| 9,299,369 B1 | 3/2016 | Biskeborn et al. |
| 9,396,745 B2 | 7/2016 | Macken et al. |
| 9,401,161 B1 | 7/2016 | Jury et al. |
| 9,401,167 B2 | 7/2016 | Pokharel et al. |
| 9,431,031 B1 | 8/2016 | Xiao et al. |
| 9,536,550 B1 | 1/2017 | Ma et al. |
| 9,558,774 B1 | 1/2017 | Macken |
| 9,576,597 B2 | 2/2017 | Trantham et al. |
| 2002/0112343 A1 | 8/2002 | Goubau et al. |
| 2004/0130321 A1 | 7/2004 | Kasajima et al. |
| 2006/0092572 A1* | 5/2006 | Kiyono ............... G11B 5/4853 360/234.5 |
| 2007/0137024 A1 | 6/2007 | Yao et al. |
| 2007/0236819 A1 | 10/2007 | Hashizume |
| 2008/0036455 A1 | 2/2008 | Beach et al. |
| 2008/0204913 A1 | 8/2008 | Umezaki et al. |
| 2008/0231985 A1 | 9/2008 | Okamoto |
| 2009/0086374 A1* | 4/2009 | Smith .................. G11B 5/4853 360/234.5 |
| 2009/0161243 A1 | 6/2009 | Sharma et al. |
| 2009/0208777 A1 | 8/2009 | Ito et al. |
| 2009/0251821 A1 | 10/2009 | Song et al. |
| 2010/0007986 A1 | 1/2010 | Mak et al. |
| 2010/0146773 A1 | 6/2010 | Li et al. |
| 2011/0019311 A1* | 1/2011 | Greminger et al. . G11B 5/4853 360/234.5 |
| 2011/0194208 A1* | 8/2011 | Chou et al. .......... G11B 5/4853 360/234.3 |
| 2012/0206830 A1 | 8/2012 | Gao et al. |
| 2013/0286502 A1 | 10/2013 | Erden et al. |
| 2013/0286511 A1 | 10/2013 | Edelman et al. |
| 2013/0314816 A1 | 11/2013 | Gao et al. |
| 2014/0063644 A1 | 3/2014 | Lou et al. |
| 2014/0153134 A1 | 6/2014 | Han et al. |
| 2015/0009787 A1 | 1/2015 | Rausch et al. |
| 2015/0117173 A1 | 4/2015 | Green et al. |
| 2015/0248904 A1 | 9/2015 | Aoyama et al. |
| 2016/0125900 A1 | 5/2016 | Biskeborn et al. |

* cited by examiner

RECORDING HEAD GIMBAL ASSEMBLY PROGRAMMING BY SELECTIVE APPLICATION OF INTERCONNECTS

CROSS-REFERENCE TO RELATED APPLICATIONS

The present application hereby incorporates by reference in their entirety U.S. application Ser. No. 14/996,833, filed Jan. 15, 2016, entitled "SELECTABLE MAGNETIC WRITERS OF DIFFERENT TARGET GEOMETRIES FOR REDUCING PERFORMANCE VARIANCE" and U.S. application Ser. No. 15/350,797, filed Nov. 14, 2016, entitled "SELECTABLE READERS FOR IMPROVEMENTS IN YIELD, RELIABILITY AND PERFORMANCE."

BACKGROUND

Data storage devices, such as disc drives, use magnetic recording heads to read and/or write data on magnetic storage media, such as a data storage discs. In a typical disc drive, one or more discs are mounted on a spindle motor, which causes the disc(s) to spin. Recording heads carried by a slider are used to read from and write to data tracks on the disc(s). The slider is typically carried by a head arm assembly that includes an actuator arm and a suspension assembly. During operation, as the disc spins, the slider glides above the surface of the disc on a small cushion of air or gas, and the actuator arm pivots to movably position the slider with respect to the disc.

As areal recording densities for storage discs increase, technological advances and changes to various components of the disc drives are needed.

SUMMARY

In one embodiment, a method for programming a head gimbal assembly is provided. The method includes building a plurality of transducers into a slider, and testing the plurality of transducers to select one of the plurality of transducers for field operation. The method also includes providing an interconnect assembly having a plurality of traces with at least one of the plurality of traces having a plurality of electrically coupled bond pads. One of the plurality of bond pads is bonded to the selected one of the plurality of transducers, with another one of the plurality of bond pads not electrically coupled to any of the plurality of transducers.

Other features and benefits that characterize embodiments of the disclosure will be apparent upon reading the following detailed description and review of the associated drawings.

BRIEF DESCRIPTION OF THE DRAWINGS

FIGS. 7A-9 are diagrammatic illustrations of trace gimbal assemblies (TGAs) in accordance with different embodiments.

DETAILED DESCRIPTION OF ILLUSTRATIVE EMBODIMENTS

In embodiments of the disclosure, read write transducers (for example, two substantially coplanar or stacked read/write transducers) are fabricated, with each of the read/write transducers having, for example, a different process variance, and then one of the read/write transducers that is most suitable for operation in a data storage device is selected. Different embodiments provide for suitable application of interconnects to the selected read/write transducer. However, prior to providing additional details regarding the different embodiments, a description of an illustrative operating environment is provided below.

Figure 1:
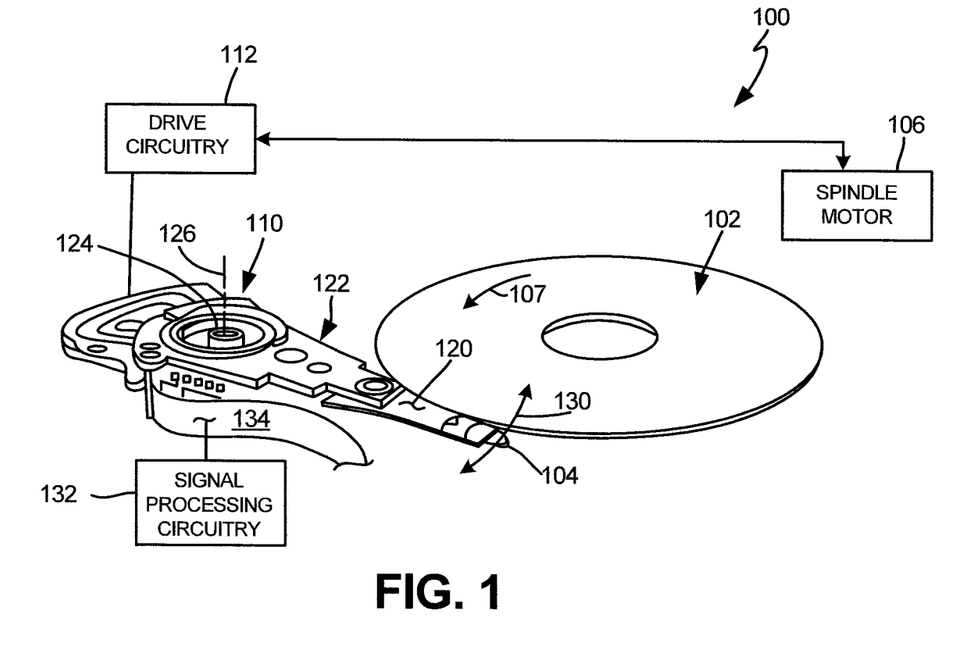
FIG. 1 illustrates an embodiment of a data storage device in which embodiments of the present application can be used.

FIG. 1 shows an illustrative operating environment in which certain read/write transducer and interconnect embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and/or writing data to the data storage medium. As shown in FIG. 1, the data storage device 100 includes a data storage medium or disc 102 and a head 104. The head 104 including transducer elements (not shown in FIG. 1) is positioned above the data storage medium 102 to read data from and/or write data to the data storage medium 102. In the embodiment shown, the data storage medium 102 is a rotatable disc or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The transducer elements of the head 104 are coupled to signal processing circuitry 132 through flex circuit 134, also known as printed circuit cable assembly (PCCA), to encode and/or decode data to and from electrical signals. Although FIG. 1 illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is coupled to a frame or deck (not shown) through a bearing 124 to pivot about axis 126. Rotation of the actuator mechanism 110 moves the head 104 in an arc across the disc in approximately cross track directions as illustrated by arrow 130.

Figure 2:
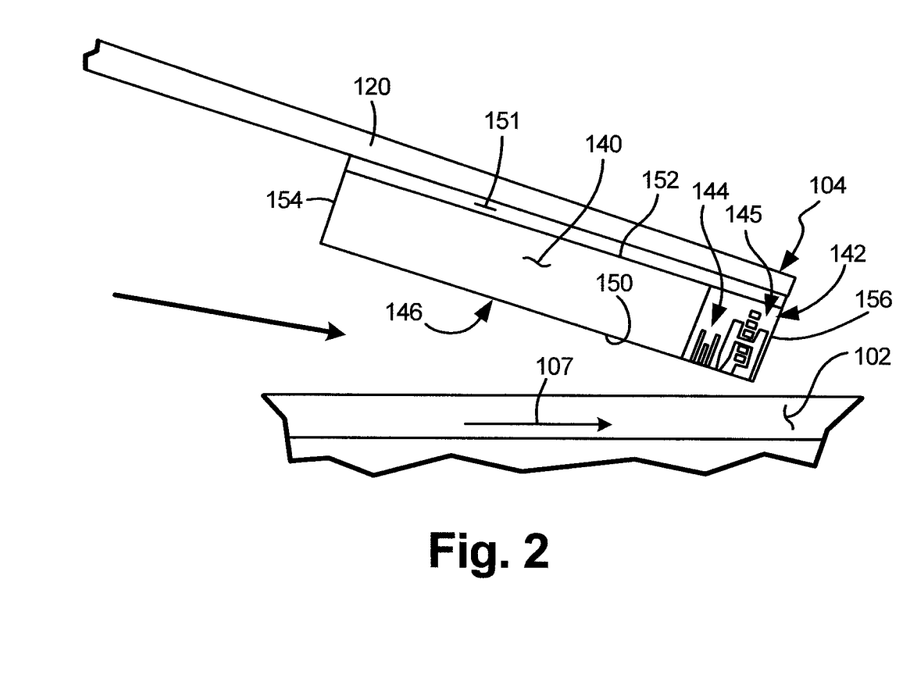
FIG. 2 is a schematic illustration of a head including one or more transducer elements above a magnetic recording medium.

FIG. 2 is a detailed illustration (side view) of the head 104 above the medium 102. The transducer elements on the head 104 are fabricated on a slider 140 to form a transducer portion 142 of the head 104. The transducer portion 142 shown includes read element 144 and write element 145 encapsulated in an insulating structure to form a transducer assembly of the head. As shown, the head 104 includes a bearing surface (for example, air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air or gas flow in direction 107 as shown in FIG. 2 along the bearing surface 146 of the slider 140 from a leading edge 154 to the trailing edge 156 of the slider 140 or head 104. The air or gas flow along the bearing surface 146 creates a pressure cushion to support the head 104 and slider 140 above the medium 102 for read and/or write operations. As shown, the transducer portion 142 is formed at or near the trailing edge 156 of the slider 140. A description of a general embodiment for forming of a transducer portion such as 142 on a wafer is provided below in connection with FIG. 3.

Figure 3:
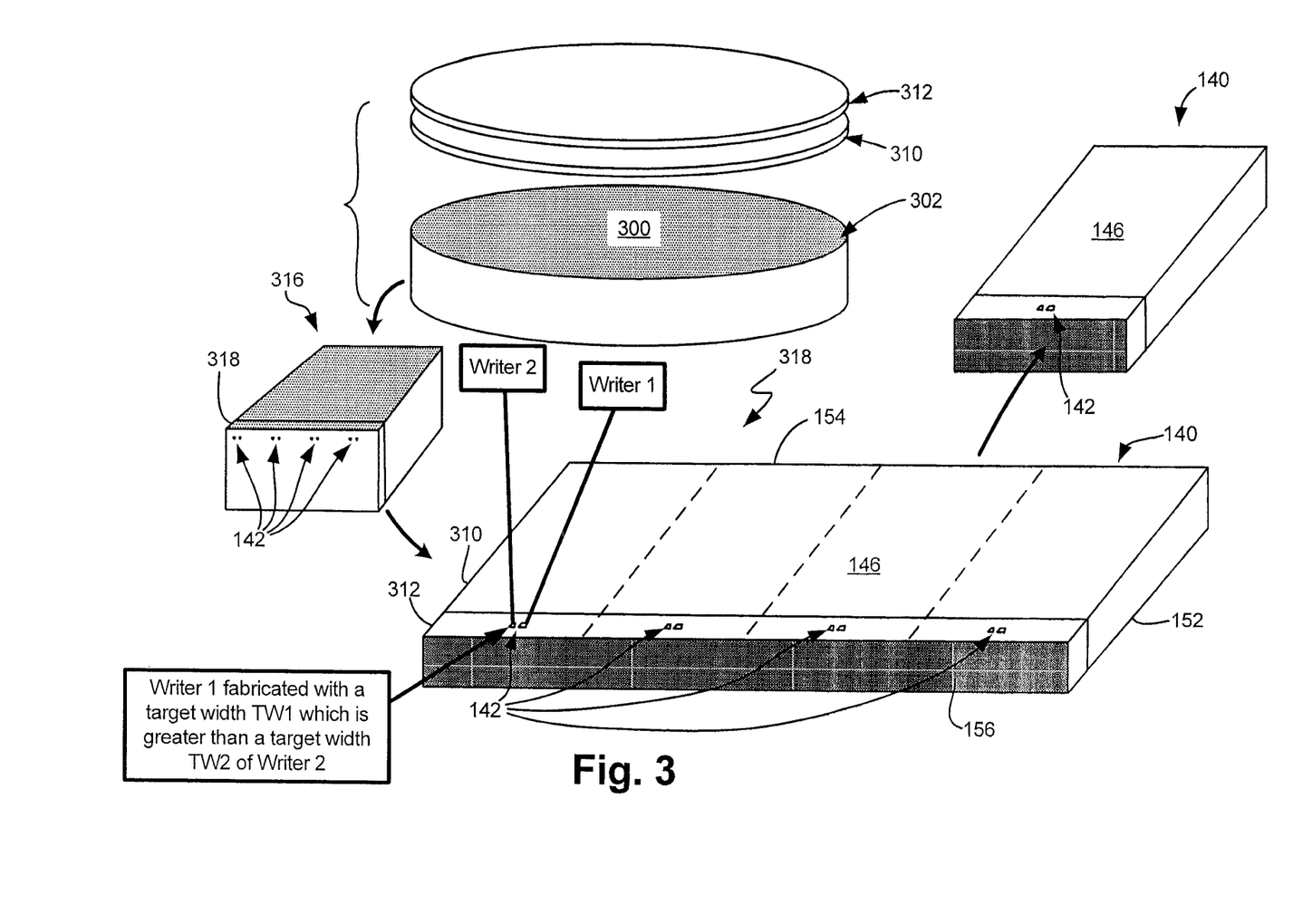
FIG. 3 is a schematic illustration of a wafer fabrication sequence for heads of a data storage device.

FIG. 3 is a schematic illustration of a wafer fabrication sequence for heads of a data storage device. As shown in FIG. 3, multiple thin film deposition layers are deposited on a surface 300 of a wafer or substrate 302 to form transducer elements 142 (illustrated schematically in FIG. 3). As shown, the multiple deposition layers include one or more read element layers 310 and write element layers 312. The read and write element layers 310, 312 are illustrated schematically in FIG. 3. Following deposition of the read and write element layers 310, 312, the wafer 302 is sliced into a plurality of bar chunks 316. The bar chunk 316 includes a plurality of slider bars 318 (one slider bar 318 is shown exploded from the chunk 316).

The sliced bars 318 have a leading edge 154, a trailing edge 156, a bearing surface 146 and a back surface 152. After the bars 318 are sliced from chunks 316, the transducer elements 142 (read and write elements) deposited on the wafer 302 are orientated along the bearing surface 146 at the trailing edge 156 of the slider bar 318. The slider bar 318 is sliced to form the sliders 140. Typically, the bar 318 is lapped and the bearing surface 146 are etched prior to slicing the bar 318 to form the individual sliders 140. Illustratively, the wafer 302 is formed of a ceramic material such as alumina ($Al_2O_3$)-titanium carbide (Ti—C). The read and write elements are fabricated on the ceramic or substrate material of the wafer 302 to form a slider body 140 of the head, and the one or more deposition layers 310, 312 form the transducer elements 142 along the trailing edge 156 of the slider body 140.

In one embodiment, fabrication of write element layer(s) 312 is carried out such that a first writer (Writer 1) of each recording head has a first target width TW1 and a second writer of each recording head has a second target width TW2. One target width (for example, TW1) is selected to be wider than a median target width and the other target width (for example, TW2) is selected to be narrower than the median target width. In such an embodiment, if the fabrication process drifts wider, the writer(s) formed with the selected narrower target width (for example, TW2) will have actual widths that are closer to the median target width. Similarly, if the fabrication process drifts narrower, the writer(s) formed with the selected wider target width (for example, TW1) will have actual widths that are closer to the median target width. A similar embodiment may be used to form readers with a variation of performance characteristics. A single recording head including multiple readers and writers that may be formed by the method of FIG. 3 is described below in connection with FIG. 4.

Figure 4:
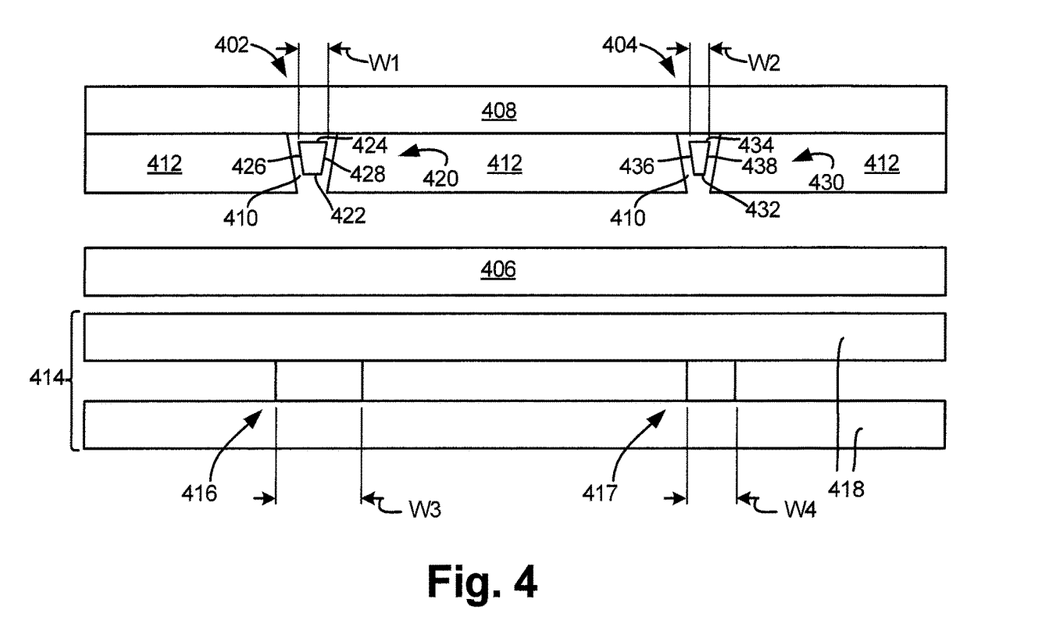
FIG. 4 is a diagrammatic illustration of an embodiment of a recording head viewed from an ABS.

FIG. 4 is a diagrammatic illustration of an embodiment of a recording head 400 viewed from an ABS (146 of FIG. 2). Recording head 400 is formed by a fabrication process that employs different target widths (for example, TW1 and TW2 described above) for individual writers of the recording head 400. In the embodiment of FIG. 4, recording head 400 includes two substantially coplanar writers denoted by reference numerals 402 and 404, respectively. As will be described further below, one of writers 402 and 404 is selected to be operational to record user data on the data storage media such as 102 (of FIG. 1). Head 400 includes a first return pole 406, a second return pole (or front shield) 408, side shields 412, magnetically inactive gaps 410 and a reader assembly 414. The reader assembly 414 includes first and second read sensors denoted by reference numerals 416 and 417 respectively, where read sensor elements 416, 417 are positioned between a pair of reader shields 418. The fabrication process of the two read sensors is substantially similar to the fabrication of a read transducer with a single read sensor. This is because, as shown in FIG. 3, the same read element layer(s) 310 (of FIG. 3), which are deposited on substrate or wafer 302 (of FIG. 3), are employed for read transducers that include single sensors or multiple sensors.

First writer (Writer 1) 402 includes a main pole that defines a pole tip 420. In the embodiment shown in FIG. 4, pole tip 420 has a trapezoidal shape along the ABS. A perimeter of pole tip 420 is defined by a leading edge 422, a trailing edge 424, and two sidewalls 426 and 428. First writer 402 has an actual width W1, which is a length of the trailing edge 424.

Second writer (Writer 2) 404 includes a main pole that defines a pole tip 430. In the embodiment shown in FIG. 4, pole tip 430 has a trapezoidal shape along the ABS. A perimeter of pole tip 430 is defined by a leading edge 432, a trailing edge 434, and two sidewalls 436 and 438. Second writer 404 has an actual width W2, which is a length of the trailing edge 434. Although first writer 402 and second writer 404 are described as being trapezoidal in shape, due to normal process variance, many pole tips are triangular in shape (e.g., leading edges 422 and 432 are zero). In general, the writers may be of any suitable shape. Readers 416 and 417 may also be of different widths (e.g., W3 is different from W4).

It should be noted that a recording head such as 400 may include elements such as writer heaters, a reader heater, a thermal asperity sensor, etc., which are not shown in the interest of simplification.

As can be seen in FIG. 4, width W1 is greater than width W2. Selection of either writer 402 or writer 404 to be the operational writer when recording head 400 is employed in a data storage device such as 100 (of FIG. 1) may depend on whether W1 or W2 is closer to the median target writer width. Similarly, selection of either reader 416 or reader 417 to be the operational reader in recording head 400 may depend on whether W3 or W4 is closer to a median target reader width. Alternatively, the writers 402 and 404 and readers 416 and 417 may be tested, and preferred ones of writers 402 and 404 and readers 416 and 417 may be selected based on the test results. A slider dynamic electrical test (SDET) to select a write transducer is described below in connection with FIG. 5. A similar test may be carried out to select a read transducer.

Figure 5:
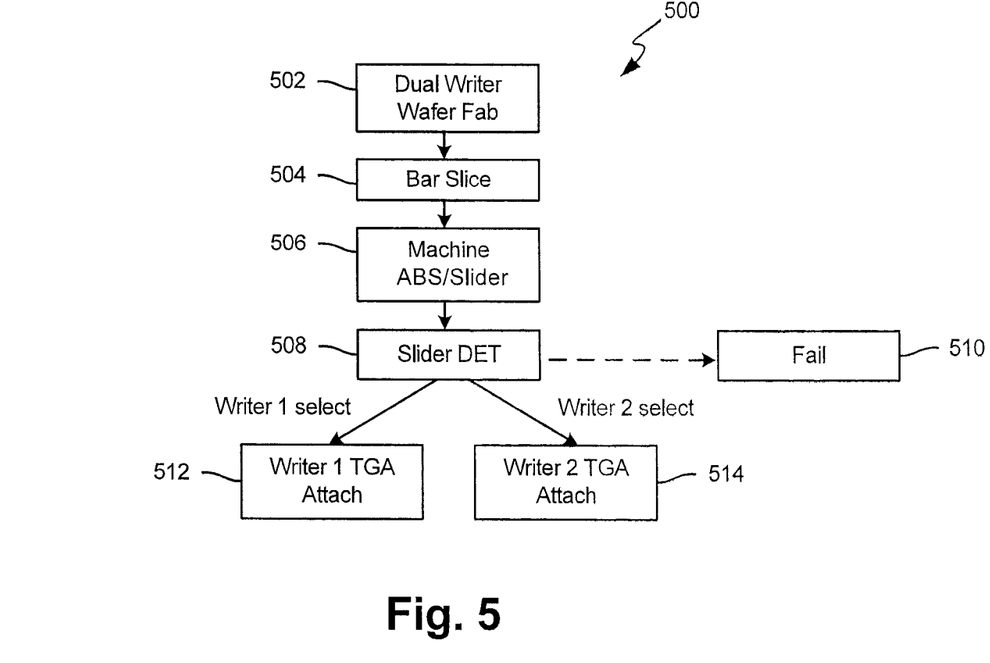
FIG. 5 is a simplified flow diagram of a method of testing a dual writer slider in accordance with one embodiment.

FIG. 5 is a simplified flow diagram 500 of a method of testing a dual writer slider in accordance with one embodiment. At step 502, fabrication of a dual writer wafer is carried out as described above in connection with FIG. 3. Thereafter, the fabricated wafer is sliced into bars at step 504 and machined to form sliders with bearing surfaces at step 506. Both steps 504 and 506 may be carried out in a manner described above in connection with FIG. 3. At step 508, a slider dynamic electrical test, SDET, may be carried out using a slider tester (not shown and described in the interest of simplification). If the slider fails tests carried out by the slider tester, the failed slider may be set aside or discarded at step 510. If the slider passes tests carried out in the slider tester and Writer 1 is selected, Writer 1 is programmed in by electrically couple it to a trace gimbal assembly (TGA) at step 512, and Writer 2 is programmed out by skipping the electrical connection to a trace gimbal assembly (TGA) at step 512. If the slider passes tests carried out in the slider tester and Writer 2 is selected, Writer 2 is programmed in by electrically couple it to a TGA at step 514, and Writer 1 is programmed out by skipping the electrical connection to a trace gimbal assembly (TGA) at step 514. Electrical coupling of a selected transducer to a TGA is described below in connection with FIGS. 6-9.

Figure 6:
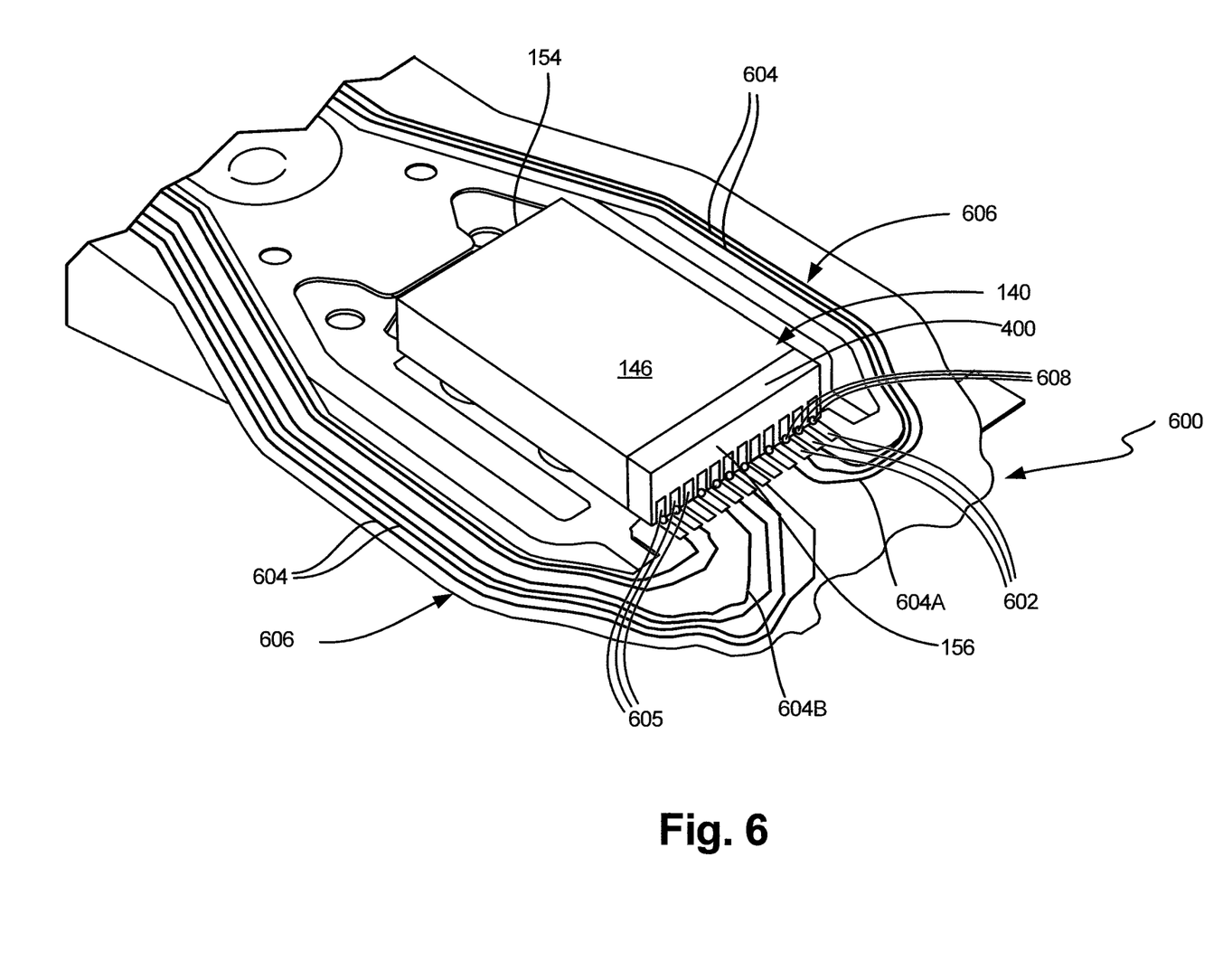
FIG. 6 is a diagrammatic illustration showing an interconnect portion providing an electrical interface to electrical elements of a recording head.

FIG. 6 is an embodiment showing a TGA portion 600 providing an electrical interface to electrical elements of a recording head 400. In FIG. 6, slider 140 having a leading edge 154 and a trailing edge 156 is shown with its ABS 146 facing upwards. As can be seen in FIG. 6, the TGA 600 includes a plurality of bond pads 602 coupled to the traces 604 along spaced gimbal arms 606 of a flex circuit extending along opposed sides of the slider 140 to electrically connect the transducer element(s) of the recording head 400 to the signal processing circuitry 132 (shown in FIG. 1). It should be noted that, instead of routing the flex circuit on opposite sides of the slider 140, the flex circuit may be routed between the slider 140 and the suspension load beam. In one embodiment, the traces 604 and bond pads 602 are formed of copper or other conductive material. In the embodiment of FIG. 6, bond pads 602 connect to a subset (e.g., less than all) slider connection pads 605. This is because the entire set of slider connection pads 605 provides electrical connections to all transducers in the slider 140 to enable a test to be carried out, and the test results identify the "inferior" transducer that is not connected for operation.

In the embodiment of FIG. 6, some of the bond pads 602 are coupled such that they share common traces (e.g., 604A and 604B) on TGA or interconnect portion 606. Utilization of common traces such as 604A and 604B connected to multiple bonds pads 602 is possible because the slider connection pads 605 of a transducer that is not selected for operation in a data storage drive is not electrically coupled to the TGA. In other words, the subset of slider connection pads 605 that provide electrical coupling to the selected transducer are coupled to the traces 604, with the remaining transducer(s) within slider 140 (e.g., the transducer(s) that are not selected) having no electrical connections to the traces 604. Electrical connectors or interconnect bonds between the subset of slider connection pads 605 and the corresponding subset of bond pads 602 are shown by dots 608. Thus, if T is the number of traces 604 (e.g., traces numbered 604, 604A and 604B), B is the number of bond pads 602, C is the number of slider connection pads 605, and D is the number of interconnections 608 between the suspension bond pads and the slider connection pads, then B and C may be equal, but D may be less than B, or C. Examples of specific TGA embodiments are provided below in connection with FIGS. 7A-9.

Figure 7A:
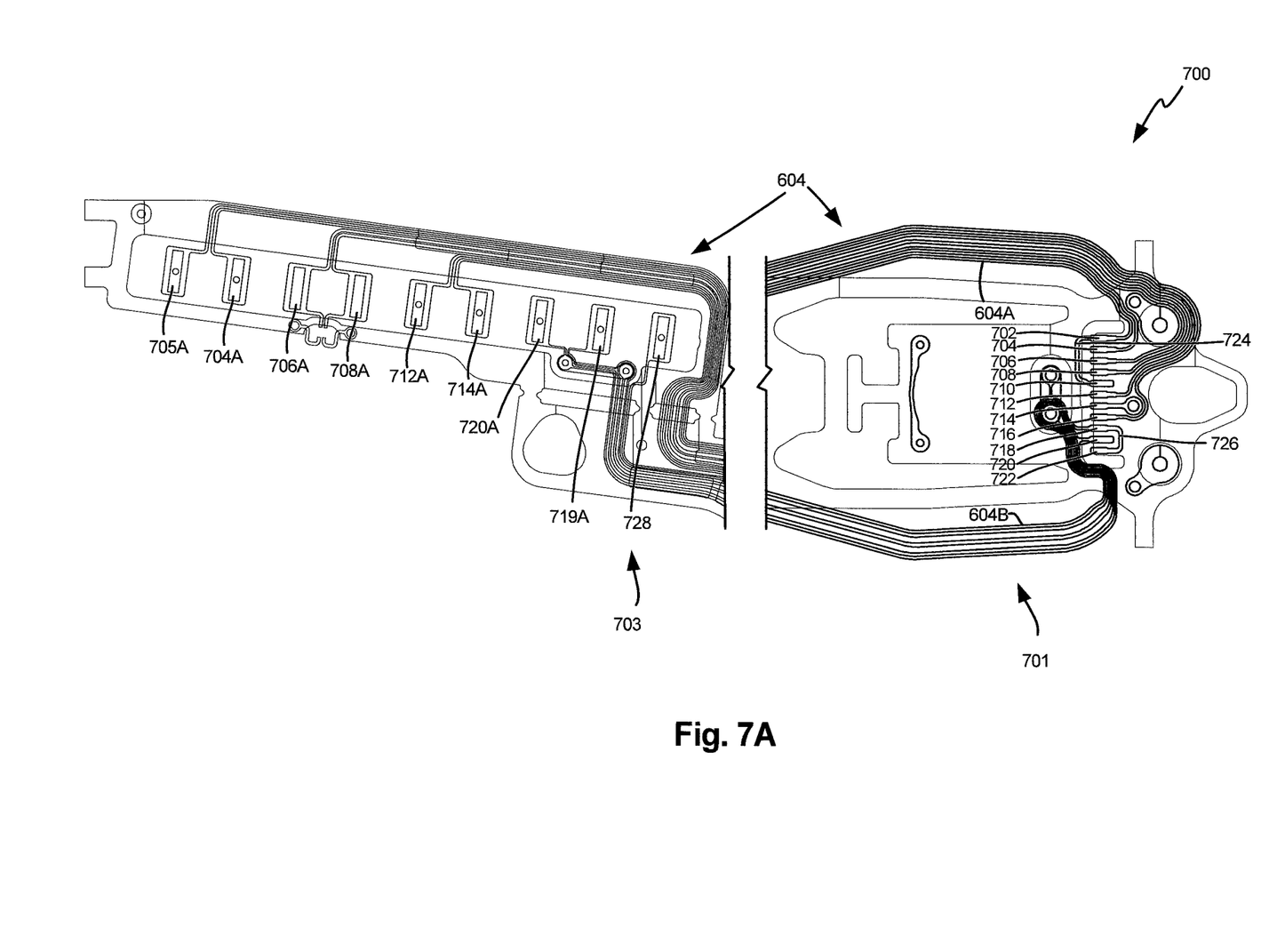

FIG. 7A is a diagrammatic illustration of a TGA 700 in accordance with one embodiment. TGA 700 includes a slider side 701 that connects to a slider such as 140 of FIG. 6 and a tail side 703, which may be connected to PCCA 134 (shown in FIG. 1) of a disc drive. In the embodiment of FIG. 7A, TGA 700 is configured to connect to either selected one of two writers (Writer 1 or Writer 2) included in an 11-pad slider (not shown in FIG. 7A). Accordingly, TGA 700 includes 11 bond pads on slider side 701. The bond pads include a heater for Writer 1 (Hw1) pad 702, heater for reader (Hr) pad 704, reader bond pads (R−) 706 and (R+) 708, a heater for Writer 2 (Hw2) pad 710, a first thermal asperity detection pad (Tx) 712, a slider substrate connection (G) pad 714, a second thermal asperity detection pad (Ty) 716, a Writer 1 bond pad (W1+) 718, a common writer bond pad (W1−) 720 and a Writer 2 bond pad (W2+) 722.

As can be seen in FIG. 7A, TGA 700 includes a common writer heater trace 604A and a common writer trace 604B. Common trace 604A is electrically coupled to both heater for Writer 1 (Hw1) pad 702 and heater for Writer 2 (Hw2) pad 710. A jumper (e.g., a small electrically conductive wire or trace), which may be referred to as writer heater trace jumper (Hwj) 724, electrically couples heater for Writer 1 (Hw1) pad 702 and heater for Writer 2 (Hw2) pad 710, thereby enabling trace 604A to be electrically coupled to both pads 702 and 710 by physically coupling trace 604A to one of pads 702 or 710. A similar write coil trace jumper (Wj) 726 electrically couples Writer 1 connection pad (W1+) 718 and Writer 2 connection pad (W2+) 722, thereby enabling trace 604B to be electrically coupled to both pads 718 and 722 by physically coupling trace 604B to one of pads 718 or 722. Due to a reduction in a number of traces by electrically coupling pads 702 and 710 and pads 718 and 722, a number of pads at tail end 703 of TGA 700 is less than a number of bond pads at the slider end 701 of TGA 500. As can be seen in FIG. 7A, like reference numerals (704A, 706A, 708A, 712A, 714A and 720A) are used for pads at the tail end 703 that correspond to bond pads at slider end 701. Further, tail end pad 705A is coupled to trace 604A and tail end pad 719A couples to trace 604B. A microactuator pad 728, which is electrically coupled to a microactuator of the TGA 700 via a trace, is also included at the tail end 703. As indicated above, the TGA 700 configuration shown in FIG. 7A enables selective electrical coupling to either Writer 1 or Writer 2. Such selective electrical coupling is described in connection with FIGS. 7B and 7C.

Figure 7B:
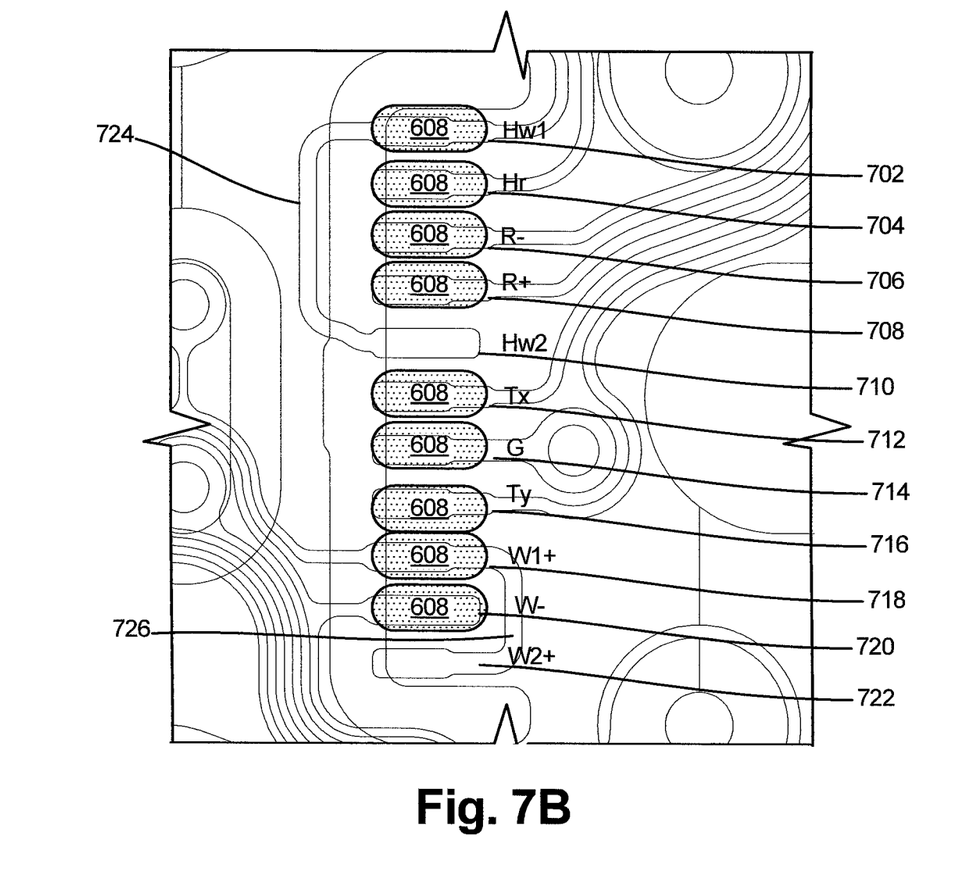
Figure 7C:
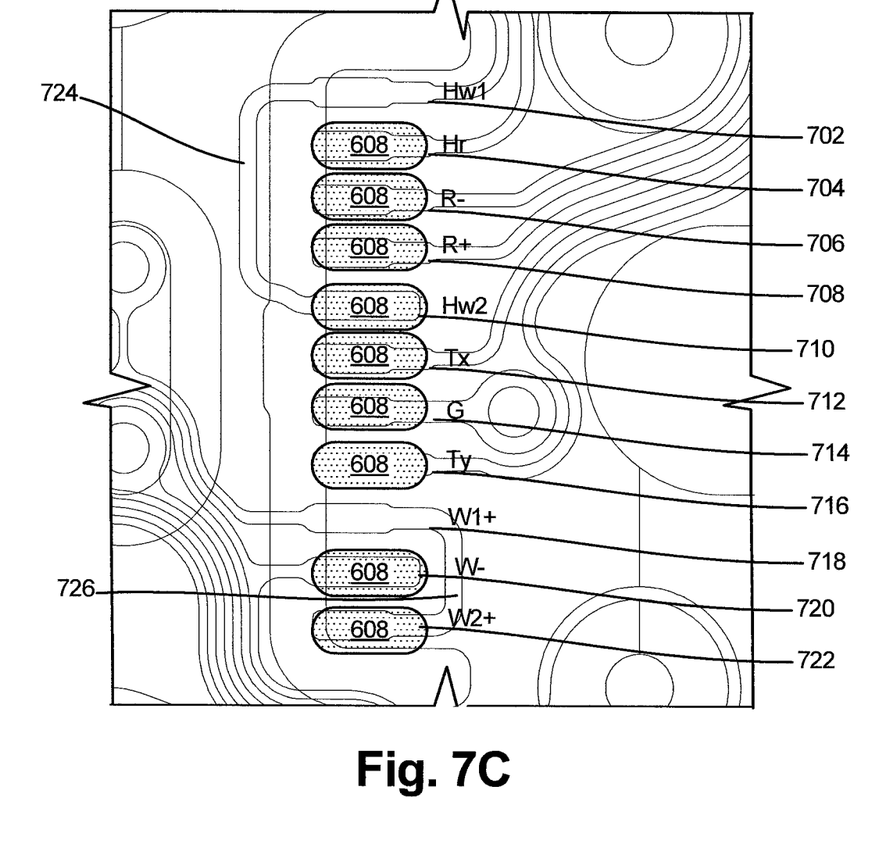

FIGS. 7B and 7C illustrate TGA 700 programed through selective application of interconnects bonds 608 that couple a subset of slider connection pads (such as 605 of FIG. 6) to a subset of bond pads 702-722. A TGA such as 700 with an attached slider such as 140 with head 400 constitutes a head gimbal assembly (HGA). In a configuration where Writer 1 is selected (FIG. 7B), W2+ 722 and Hw2 710 are skipped and left unbonded while all other bond pads are coupled with interconnect bonds 608. In a configuration where Writer 2 is selected (FIG. 7C), W1+ 718 and Hw1 702 are skipped and left unbonded and all other slider connection pads are coupled with bonds 608. Electrical interconnect bonds 608 may typically be formed with individually jetted solder balls, but the interconnect bonds 608 may not be so limited. In alternative embodiments, interconnect bonds 608 may be made with gold ball bonds, solder pillars on slider or TGA pads with laser reflow, ultrasonic bonding, electrically conductive adhesive, anisotropically conductive films, or other methods.

Figure 8:
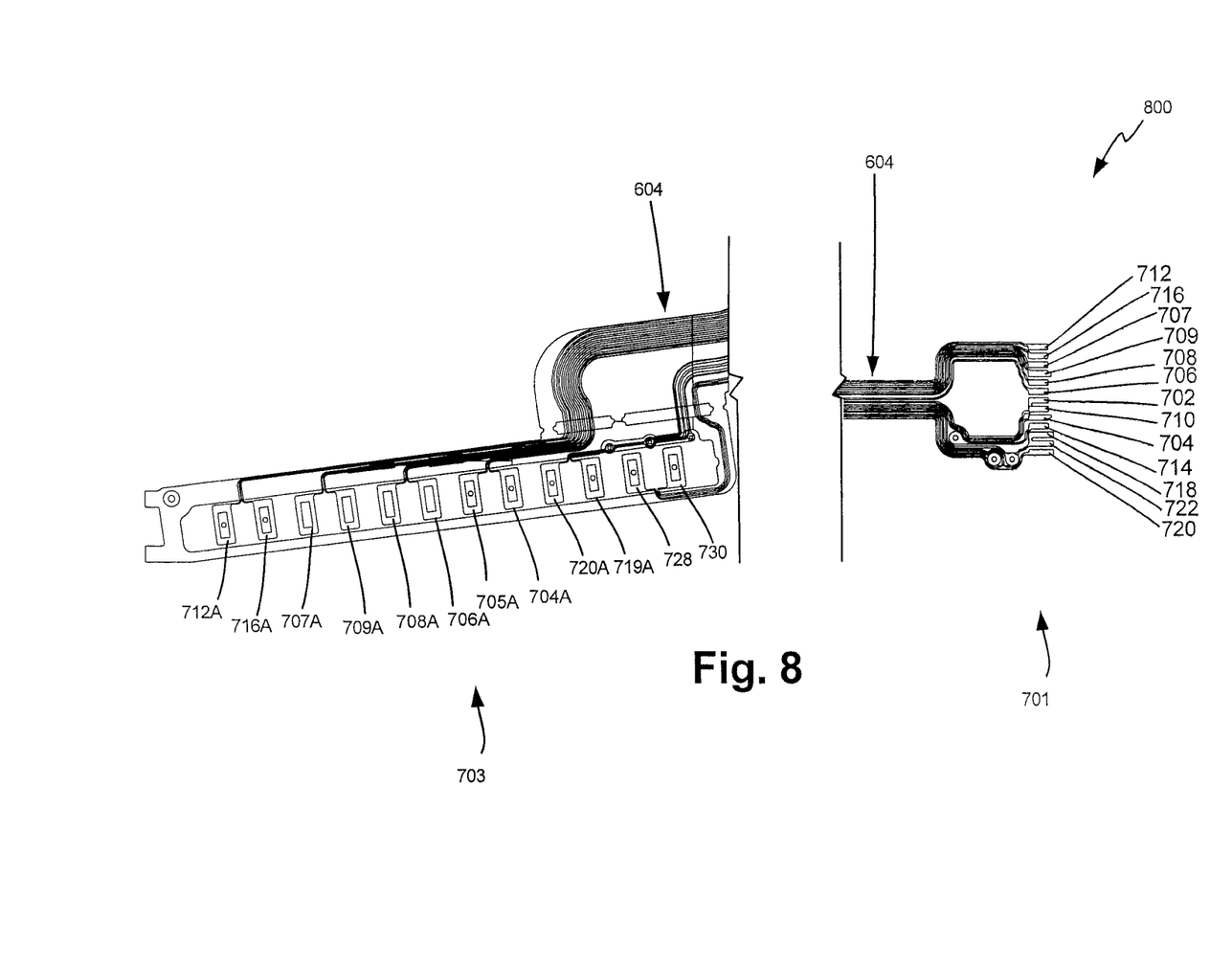

FIG. 8 is a diagrammatic illustration of a TGA 800 in accordance with one another embodiment. In FIG. 8, the same reference numerals used in FIG. 7A are utilized for similar corresponding elements. Also, in the interest of brevity, a description of those similar elements is not repeated. In the embodiment of FIG. 7A, TGA 800 is configured to connect a selected one of two writers included in a 13-pad slider (not shown in FIG. 7A). The two additional pads compared to the embodiment of FIG. 7A is due to the inclusion of two readers R1 and R2 in the embodiment of FIG. 8. Accordingly, TGA 800 includes 13 bond pads 604 on slider side 701. The bond pads are similar to those included in the FIG. 7A with to additional reader bond pads 707 and 709 and corresponding additional tail pads 707A and 709A shown in FIG. 8. Also, an additional tail pad 730 may be included in the embodiment of FIG. 8 to connect to a microactuator (not shown). Pad 716A is a tail end pad that corresponds to slider end pad 716.

As in the case of TGA 700 of FIG. 7A, TGA 800 of FIG. 8 includes a common writer heater trace 604A and a common writer trace 604B. In TGA 800, common trace 604A is electrically coupled to both heater for Writer 1 (Hw1) pad 702 and heater for Writer 2 (Hw2) pad 710, which are physically connected to form a forked bond pad. A similar forked bond pad is formed by physically coupling Writer 1 connection pad (W1+) 718 and Writer 2 connection pad (W2+) 722, thereby enabling trace 604B to be electrically coupled to both pads 718 and 722 in a manner shown in FIG. 8. In other respects, the embodiments of FIG. 7A and FIG. 8 are substantially similar.

Figure 9:
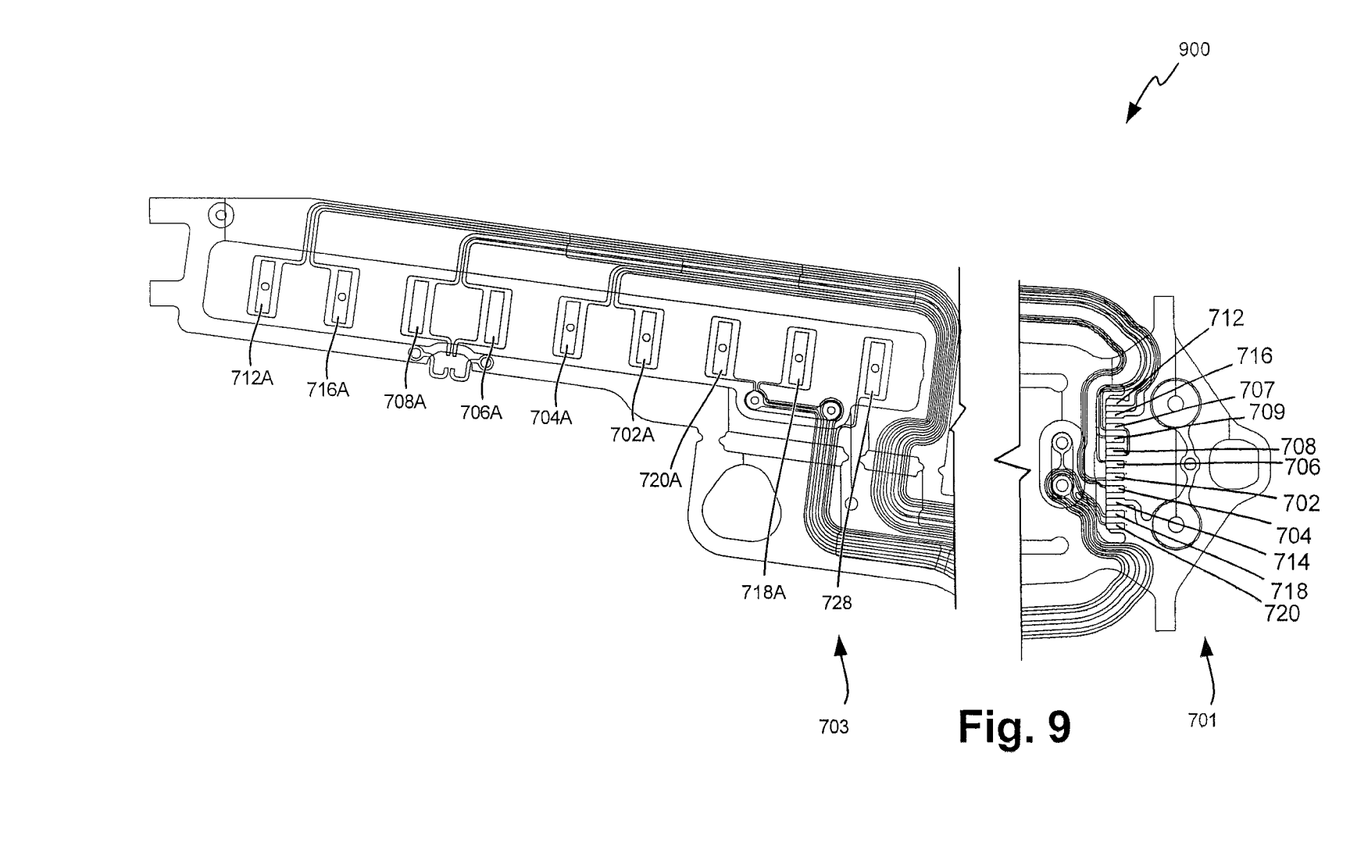

Although dual writers are described, similar embodiments may be utilized for readers, and a plurality of read/write transducers may be fabricated on a slider to program an HGA through selective application of interconnects with distinct interconnect process recipes maintained for each configuration. FIG. 9 is a diagrammatic illustration of TGA 900 for connection to an 11-pad slider that includes two readers with only one of the two readers to be electrically coupled to the TGA 900 bond pads. The preferred one of the two readers may be determined by a suitable test on the slider, and selective bonding may be carried out in a manner similar to that described in connection with FIGS. 7A-7C, with the selection involving reader bond pads instead of writer bond pad selection of FIG. 7A-7C. In the interest of brevity, no additional description of the similar connection technique is provided in connection with FIG. 9. It should be noted that the single writer in the embodiment of FIG. 9 has a writer heater bond pad 702 and a writer connection pad 718, which have corresponding tail end pads 702A and 718A, respectively.

One skilled in the art will recognize that a plurality of slider to TGA interconnect configurations are possible, and a TGA may have two or more bond pads for transducers with different features, and further, those bond pads may be electrically coupled in a variety of geometries. Moreover, as described above in the disclosure, there are more transducer features built on the slider than there are TGA traces available on the HGA, however, alternative embodiments are possible. For example, in a reversed concept, an HGA with more TGA features than slider transducers available may be produced, such that selected TGA features would be programmed and the slider transducer features kept static.

Although slider end bond pad interconnects are described, alternative geometries for interconnects may also be employed, such as top bond pad interconnects, leading edge bond pads, and planar vias. One skilled in the art will recognize that the geometry and interconnect selection process may be developed to work with the specific constraints of a variety of interconnect processes and geometries.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
   a plurality of T traces having a slider end;
   a plurality of B suspension bond pads electrically coupled to the plurality of T traces at the slider end;
   a subset of the B suspension bond pads at the slider end are electrically coupled to a corresponding subset of a plurality of C slider contact pads by a plurality of D interconnecting electrical bonds, with D being less than B at the slider end; and a first trace of the plurality of T traces is electrically coupled to first multiple electrically coupled suspension bond pads of the plurality of B suspension bond pads.

2. The apparatus of claim 1 and wherein the first trace of the plurality of T traces is directly coupled to a first suspension bond pad of the first multiple electrically coupled suspension bond pads, and wherein the first suspension bond pad of the first multiple electrically coupled suspension bond pads is electrically coupled to a second suspension bond pad of the first multiple electrically coupled suspension bond pads by a jumper.

3. The apparatus of claim 1 and wherein the first multiple electrically coupled suspension bond pads form a forked set of bond pads, and wherein the first trace of the plurality of T traces is directly coupled to the forked set of bond pads.

4. The apparatus of claim 1 and wherein a second trace of the plurality of T traces is electrically coupled to second multiple electrically suspension bond pads of the plurality of B suspension bond pads, and wherein the first multiple electrically coupled suspension bond pads and the second multiple electrically coupled suspension bond pads are disjoint subsets of the plurality of B suspension bond pads.

5. The apparatus of claim 4 and wherein the first multiple electrically coupled suspension bond pads of the plurality of B suspension bond pads comprise a first writer heater bond pad and a second writer heater bond pad.

6. The apparatus of claim 5 and wherein the second multiple electrically coupled suspension bond pads of the plurality of B suspension bond pads comprise:
a first writer positive bond pad and a second writer positive bond pad; or
a first writer negative bond pad and a second writer negative bond pad.

7. The apparatus of claim 5 and wherein the first multiple electrically coupled suspension bond pads of the plurality B suspension bond pads comprise a first reader positive bond pad and a second reader positive bond pad.

8. The apparatus of claim 7 and wherein the second multiple electrically coupled suspension bond pads of the plurality B suspension bond pads comprise a first reader negative bond pad and a second reader negative bond pad.

9. The apparatus of claim 5 and wherein the second multiple electrically coupled suspension bond pads of the plurality B suspension bond pads comprise:
a first writer positive bond pad and a second writer negative bond pad; or
a first writer negative bond pad and a second writer positive bond pad.

10. A head gimbal assembly comprising:
a slider comprising a plurality of C slider contact pads;
a plurality of T traces having a slider end;
a plurality of B suspension bond pads electrically coupled to the plurality of T traces at the slider end, with subsets of the B suspension bond pads being electrically coupled together at the slider end, each subset of electrically coupled bond pads being disjoint; and
one pad in each subset of the B suspension bond pads is electrically coupled to a corresponding pad of the plurality of C slider contact pads.

11. The head gimbal assembly of claim 10 and wherein a first trace of the plurality of T traces is electrically coupled to a first subset of electrically coupled suspension bond pads of the plurality of B suspension bond pads.

12. The head gimbal assembly of claim 11 and wherein the first trace of the plurality of T traces is directly coupled to a first suspension bond pad of the first subset of electrically coupled suspension bond pads, and wherein the first suspension bond pad of the first subset of electrically coupled suspension bond pads is electrically coupled to a second suspension bond pad of the first subset of electrically coupled suspension bond pads by a jumper.

13. The head gimbal assembly of claim 11 and wherein the first subset of electrically coupled suspension bond pads form a forked bond pad, and wherein the first trace of the plurality of T traces is directly coupled to the forked bond pad.

14. The head gimbal assembly of claim 11 and wherein a second trace of the plurality of T traces is electrically coupled to a second disjoint subset of electrically coupled suspension bond pads of the plurality of B suspension bond pads.

15. The head gimbal assembly of claim 14 and wherein the first subset of electrically coupled suspension bond pads of the plurality B suspension bond pads comprises a first writer heater bond pad and a second writer heater bond pad.

16. The head gimbal assembly of claim 15 and wherein the second disjoint subset of electrically coupled suspension bond pads of the plurality of B suspension bond pads comprises:
a first writer positive bond pad and a second writer positive bond pad; or
a first writer negative bond pad and a second writer negative bond pad.

17. A method comprising:
providing a plurality of T traces having a slider end;
providing a plurality of B suspension bond pads electrically coupled to the plurality of T traces at the slider end;
electrically coupling a subset of the B suspension bond pads at the slider end to a corresponding subset of a plurality of C slider contact pads by a plurality of D interconnecting electrical bonds, with D being less than B at the slider end; and
electrically coupling a first trace of the plurality of T traces to first multiple electrically coupled suspension bond pads of the plurality of B suspension bond pads.

18. The method of claim 17 and wherein the first multiple electrically coupled suspension bond pads form a forked bond pad.

19. The method of claim 17 and wherein the first multiple electrically coupled suspension bond pads are coupled together by a jumper.

* * * * *